May 3, 1960 C. F. TEICHMANN ET AL 2,935,614
RADIOACTIVE PROSPECTING
Filed May 17, 1954 4 Sheets-Sheet 1
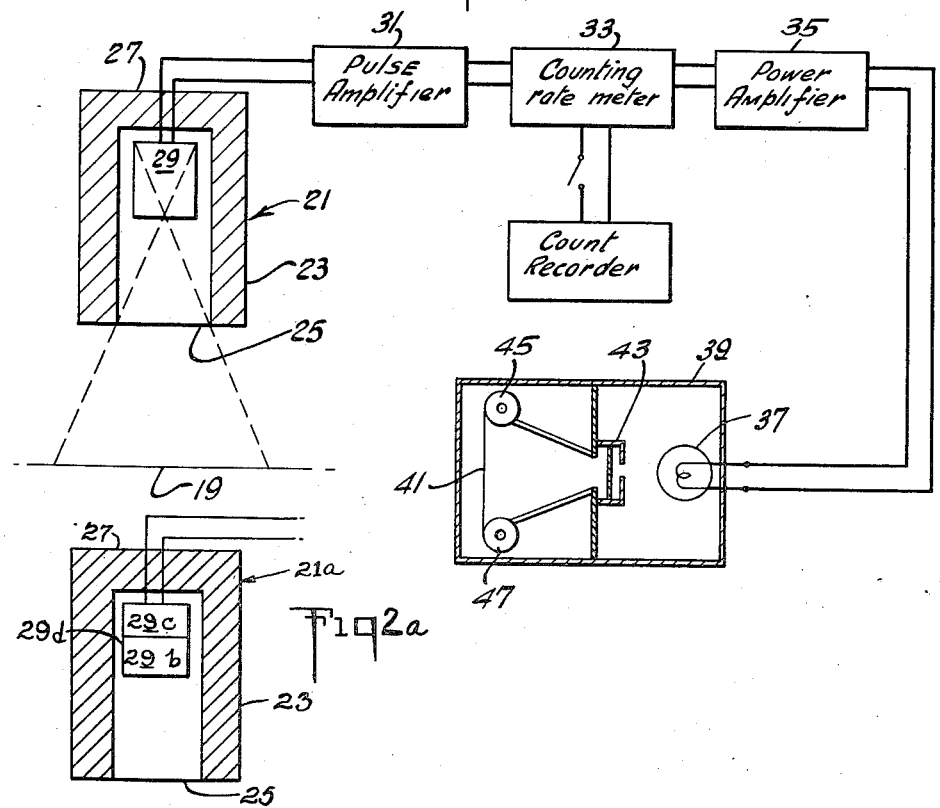

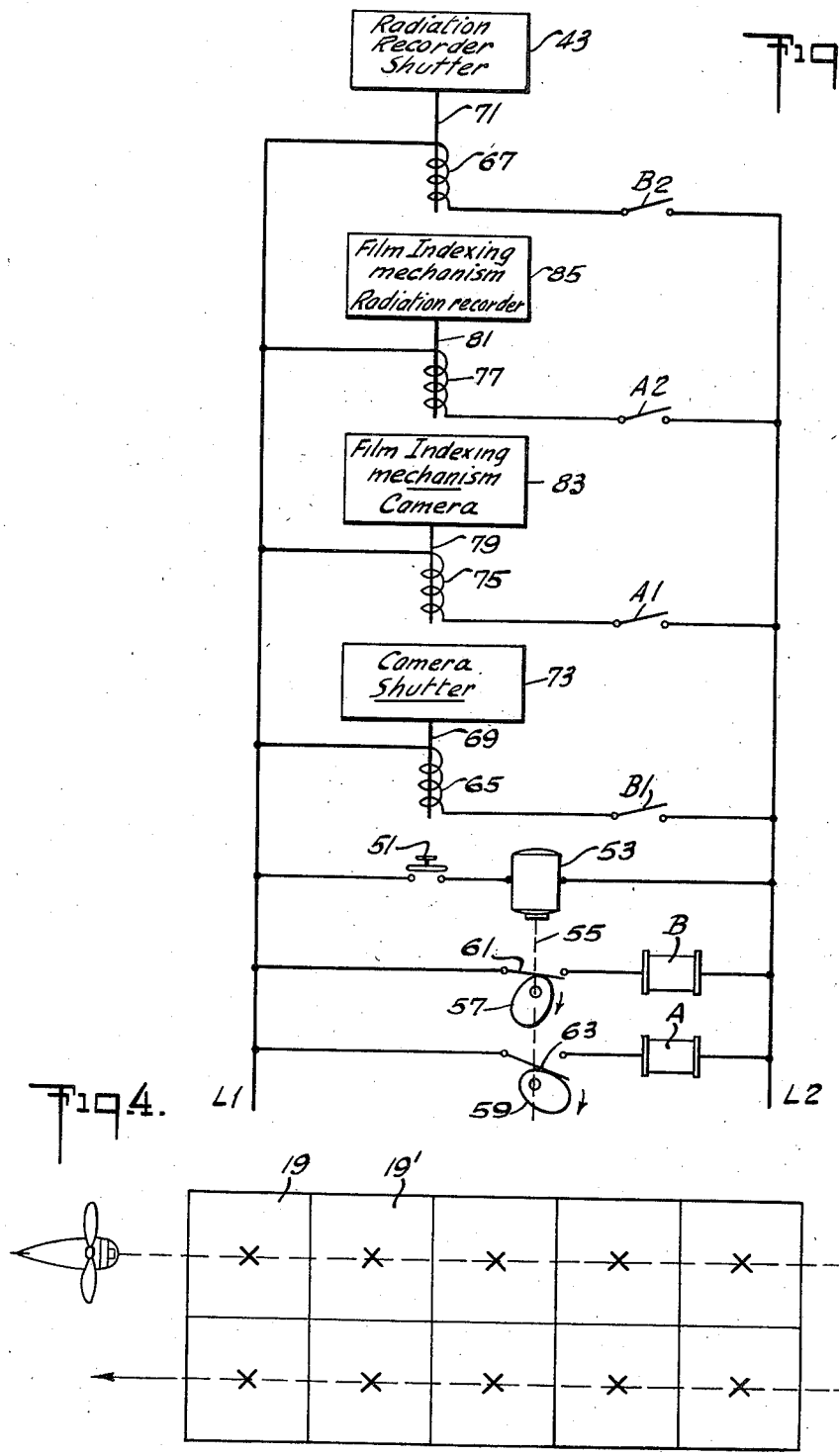

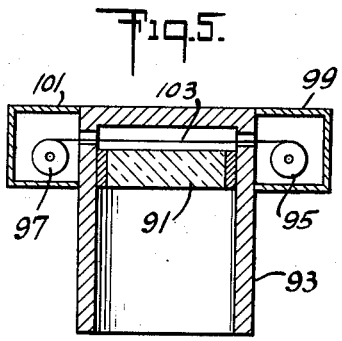
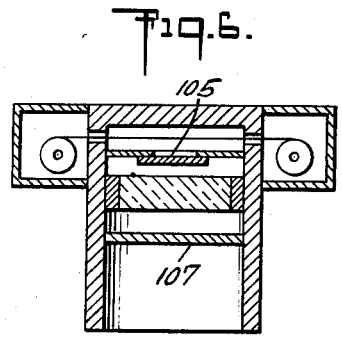
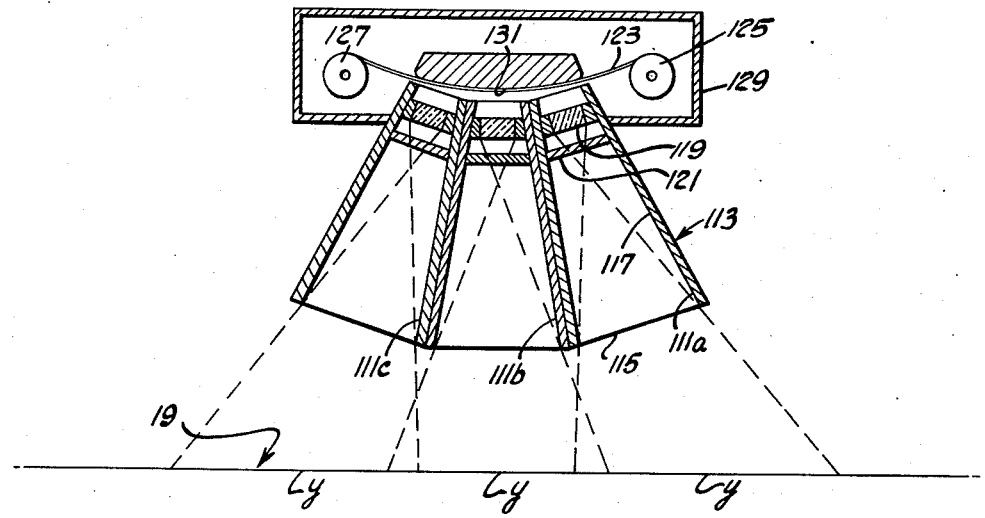
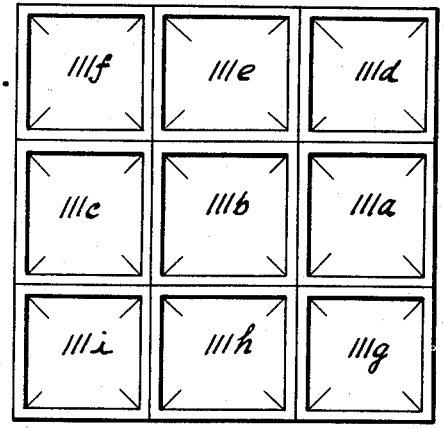

United States Patent Office 2,935,614
Patented May 3, 1960

2,935,614

RADIOACTIVE PROSPECTING

Charles F. Teichmann, Crestwood, and Clifford G. Ludeman, Scarsdale, N.Y., assignors to Texaco Development Corporation, New York, N.Y., a corporation of Delaware Application May 17, 1954, Serial No. 430,123

16 Claims. (Cl. 250—83.6)

The present invention relates to a novel method of and apparatus for prospecting for minerals by detecting radiation emanating from the ground, for example gamma rays emanating from radioactive minerals such as uranium and radium ores. More particularly, the invention is concerned with conducting radioactivity surveys by means of air-borne instruments, as in an aircraft such as a helicopter, fixed wing aeroplane, or lighter-than-air dirigible which is flown rapidly over large areas of the earth.

Air-borne radioactivity prospecting has been employed heretofore, but it has been difficult to relate radioactivity measurements to specific small areas of the terrain over which the survey has been made. Such correlation is necessary so that interesting deposits can be examined in detail subsequently by prospecting at the surface of the earth.

Additionally, prior methods of aerial radioactivity surveying yielded only an integrated average datum when surveying an area of considerable size. In order to obtain detailed information by such prior methods it was necessary to reduce the size of the area surveyed and consequently to increase the work, time and expense proportional to a function of the square of the reciprocal of the fractional reduction.

In accordance with the present invention, the disadvantages of the prior art are successfully overcome by photographing a relatively large area of the terrain while concurrently detecting the radiation emanating from the area, desirably from two or more relatively small finite portions of the large area, as responses which are converted to a visual intensity record which can be compared and correlated with the photograph to locate mineral deposits accurately in the large area. This is advantageously done by continuously or intermittently photographing successive adjoining areas of the terrain from a remote position above the earth to form a photographic record such as a continuous long photograph or a series of individual connected photographs, by concurrently detecting at the same position the radiation from the same areas as a series of responses varying in accordance with radiation intensity, and converting such responses to photographic or other visual intensity records which can be compared and correlated with the photographs to indicate which areas merit closer scrutiny. This type of survey is advantageously made directly from a self-propelled aircraft, or a towed aircraft such as a glider or other device towed on a cable, in either case carrying both a camera and a radiation detector rapidly over the terrain at a selected height, such as 100 to 200 feet above the earth's surface.

Photographs of areas of the earth and the photographic records of radiation intensity can be made on adjoining portions of the same film so that a direct correlation is obtained. Alternatively, the photographs and the photographic records of radiation intensity can be made on separate synchronized strips of film which can then be developed and superimposed one upon the other, or otherwise placed in juxtaposition, for the desired correlation.

The method described above can be performed successfully with a single collimated detector which is so constructed and arranged as to see substantially the same area as the photographic camera, for example an area 150 feet square when the aircraft is flying at an altitude of 150 feet.

While the method of the invention is highly advantageous in such a case, even greater advantages are obtained by employing a radioactivity detector which is made up of a plurality of independent detector units arranged in juxtaposition and so constructed and arranged that the several units detect radiation from separate adjoining small fractional parts of the large area seen by the camera at any given moment. A plurality of separate responses are obtained from the several units which are converted to separate adjoining photographic intensity records on a single film, or to other types of intensity records. A mosaic radiation intensity record is obtained on film which can be compared with the picture made by the camera, so that the location of radioactive minerals within the large photographed area can be ascertained exactly within a few feet. For example a cluster of 9 radiation detectors makes it possible for each individual detector to see a small 50 foot square section of the large 150 foot square area photographed by the camera. With such improved discrimination the making of a subsequent ground survey to locate the mineral deposit is made relatively easy.

The invention will be described more in detail below with reference to the accompanying drawings, wherein:

Fig. 1 is a side elevational view showing schematically how an air-borne radioactivity survey is conducted by the present invention;

Fig. 2 is a schematic side elevational view, parts being in vertical section, showing one form of radiation detector and a suitable corollary group of apparatus for converting detected radiation to a photographic or other intensity records;

Fig. 2a shows another form of radiation detector which may be employed as part of the apparatus illustrated in Fig. 2;

Fig. 3 is an electrical diagram showing an arrangement of apparatus for automatically operating the radiation detector and photographic camera in timed relation to one another;

Fig. 4 is a diagram showing schematically a bird's eye view of a portion of the earth's surface showing the manner of conducting a survey in accordance with the invention;

Figs. 5, 6 and 7 are vertical sectional views showing schematically three modifications of radiation detectors in accordance with the invention;

Fig. 8 is a view of the radiation detector of Fig. 7 as seen from the bottom;

Figure 10:
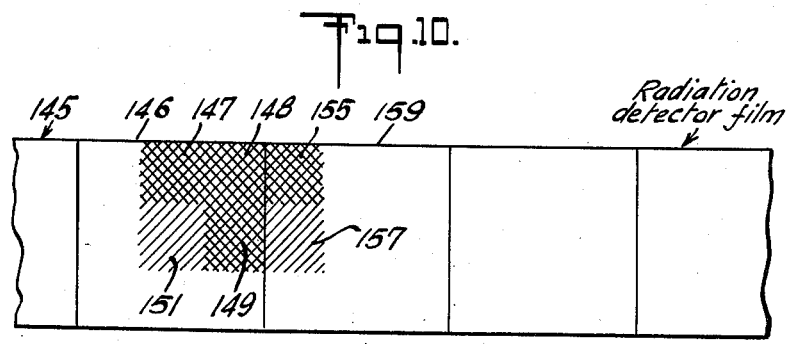
Figure 11:
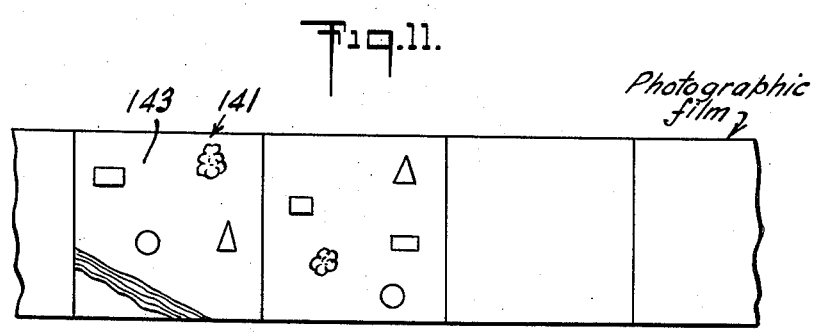

Fig. 10 is a plan view of a photographic film showing schematically the appearance of such a film after a radiation intensity record has been made thereon with a multiple unit radiation detector of the type shown in Fig. 7; and Fig. 11 is a plan view of a pictorial photographic film corresponding to the radiation photographic film of Fig. 10, showing schematically how land marks are recorded pictorially as a basis for locating exactly the interesting areas shown on the film of Fig. 10.

Referring to Fig. 1 an aircraft 11, such as a helicopter, is flown across the surface of the earth 13 at a constant height such as 150 feet and at a constant ground speed such as 30 miles per hour. Aircraft 11 carries a photographic camera 15 and an adjacent radiation detector 17, both of which are so positioned in the aircraft and so directed toward the surface of the earth that their longitudinal axes intersect and each sees substantially the same area 19 of the terrain beneath the aircraft.

In conducting the survey over a large expanse of terrain the camera 15 and the radiation detector 17 are actuated simultaneously to record on one or two films the appearance of, and the intensity of radiation from, a selected area 19, such as one 150 feet square, immediately below the aircraft. Thereafter, the films are indexed to place new unexposed portions in position for recording.

When the aircraft has reached a point centered above the next adjoining area 19', of substantially the same size, the camera and the radiation detector are again simultaneously actuated. As a result, the aircraft traverses a series of adjoining areas as shown in Fig. 4, while making successive independent records of the appearance of and the radiation intensity from each area 19, 19' et seq.

Referring to Fig. 2, a suitable radiation detector 21 comprises a relatively long and narrow tubular radiation shield 23, of lead or similar material possessing the ability to prevent the penetration of radiation, having an open end 25 facing toward the ground and a closed end 27 to exclude as much as is practical of cosmic radiation. The length of shield 23 need not be longer than the length of the detector itself for effective collimation. That is, the open end of the shield may be flush with the end of the detector. Greater extension of the shield gives better discrimination but there may be sacrificed some degree of sensitivity.

Within the radiation shield 23, near its upper, i.e., closed end and remote from the open end 25, is located a radiation detecting element 29 of any suitable type. A Geiger-Mueller counter or similar electrical pulse generating device may be used, or a luminophor which is active to generate light scintillations in response to radiation. This radiation detecting element 29 can see the area 19 on the ground with considerable discrimination, especially when a tubular shield 23 of relatively great length is employed to collimate the received radiation and cause the detector to respond to radiation from a fairly exactly defined area on the ground.

A Geiger-Mueller type of counter generates an electrical impulse directly, and this impulse can be amplified through a pulse amplifier 31, a counting rate meter 33, and a power amplifier 35 so as to energize a light source 37 located within a recording device 39 having a photographic film 41 and a shutter 43. The light source 37 may be of any suitable type, such as an incandescent lamp having a filament. However, since the incandescence of a heated filament may not change as rapidly as desired, i.e., as rapidly as the signal modulations, due to "thermal lag," it may be preferred to use a gas-filled tube wherein changes may be effected as rapidly as the de-ionization time.

Film 41 is mounted on rollers 45 and 47 which are actuated to index the position of the film periodically after each area of the terrain has been surveyed. In ordinary operation the sequence of events is first to operate the shutter 43 in synchronism with the shutter of the photographic camera 15 so that both are opened simultaneously and then closed, shutter 43 remaining open a little longer for longer exposure of the detector to radiation. Thereafter, indexing of the film 41 is accomplished automatically in timed relation thereto prior to centering of the surveying instruments over the next adjoining area to be surveyed.

Alternatively, or additionally, the count rate for a given period of exposure can be recorded on tape or the like by punched holes, ink marks or the like and the record can then be correlated with the terrain photographs to locate interesting deposits.

Automatic coordinated operation of the survey instruments can be accomplished by any suitable sequence timing apparatus, such as that of the electrical system shown in Fig. 3. To set the automatic timing mechanism in operation a switch 51 is closed manually to energize an adjustable speed timing motor 53 connected across a pair of power lines L1 and L2. Motor 53 has a drive shaft 55 carrying a pair of timing cams 57 and 59 which operate a pair of switches 61 and 63, respectively. Cam 57 is so shaped that switch 61 is closed while switch 63 is still open, consequently energizing a relay B which closes a pair of switches B1 and B2 to energize a pair of solenoids 65 and 67 having movable cores 69 and 71, respectively, connected to suitable mechanisms for actuating the camera shutter 73 and the radiation recorder shutter 43. The speed of timing motor 53 should be so correlated with the flying speed of the aircraft that exposure of the radiation detector and operation of the camera occur automatically when centered over each successive area.

Immediately after the shutters have operated, the cam 59 closes switch 63 shortly after the cam 57 has permitted switch 61 to reopen, consequently energizing a relay A which closes switches A1 and A2 to energize solenoids 75 and 77 having movable cores 79 and 81, respectively, connected to film indexing mechanisms 83 and 85 of the photographic camera and the radiation recorder, respectively. After this indexing operation, cam 59 permits switch 63 to reopen.

Solenoid cores 69, 71, 79 and 81 can be made to actuate the shutters and film indexing mechanisms by any suitable type of device which is well within the skill of the art. For example, each of the several cores can constitute a connecting rod pivotally connected to the crank arm of a ratchet and pawl device which, on the forward motion of the crank arm, actuates the shutter or indexing mechanism, and thereafter is returned by spring action in a reverse direction to prepare the device for its next operation.

When a luminophor is employed as the radiation detecting element, instead of a Geiger-Mueller tube, the scintillations of light produced by the luminophor in response to radiation are converted into electrical impulses by a conventional photo-multiplier tube which is connected through an amplifier system to a photographic recording device, exactly as shown in Fig. 2. Detector apparatus employing a luminophor is illustrated in Fig. 2a which shows a radiation detector 21a, similar to the detector 21 of Fig. 2, but having a scintillation detector 29a mounted within the shield 23, instead of the Geiger-Mueller detector 29, shown in Fig. 2. The scintillation detector 29a comprises a luminophor 29b responsive to radiation to be detected and a photomultiplier tube 29c positioned above the luminophor 29b for converting the scintillation output thereof to electrical pulses which are coupled to a pulse amplifier 31 and other equipment, as shown in Fig. 2.

A radiation detecting luminophor also can be used in a more direct fashion to produce a photographic record of radiation intensity, as shown in Figs. 5 and 6. Referring to Fig. 5, a luminophor 91 is positioned within a radiation shield 93 having a pair of film rollers 95 and 97 housed within light-proof boxes 99 and 101 on the sides of the shield. A film 103 extends between the rollers and has its photosensitive surface positioned in close juxtaposition to the rear face of the luminophor 91 so that scintillations generated in the luminophor by radiation from the earth act to fog the film 103 more or less, in accordance with their intensity.

As shown in Fig. 6 a more exact record of the radiation from discrete adjoining areas is obtained by providing a shutter 105 which is actuated each time that the detector is centered on a new area of the terrain. For preventing any detrimental effect of visible light on the film, there is also provided a thin shield 107 of light impervious material, such as aluminum, which is pervious to gamma rays and like radiation.

Fig. 7 shows our preferred radiation detector, comprising a cluster of nine identical collimated detector units 111(a)–111(i), inclusive, each of which is so constructed and arranged as to see a small part y comprising about ⅑ of the large area 19 seen by the photographic camera 15, to assure good discrimination of the radiation from the adjoining small areas whereby they can subsequently be easily located on the photographic view of the large area 19.

Each detector unit comprises a tubular radiation shield 113 of square cross section having an open end 115 of relatively great area for receiving radiation, and side walls 117 of radiation-impervious material which taper toward one another from the open end 115. A radiation responsive device 119 is located near the narrow end of the radiation shield at a position remote from the end 115 so as to see a relatively small and sharply defined area y on the terrain. Advantageously each detector unit is provided with a light shield 121 of aluminum foil which is pervious to radiation.

The several radiation detectors 111a–i are clustered together with their longitudinal axes tapering together from their radiation receiving ends 115 so as to assure quite sharply defined boundary lines between the individual small areas y observed by the several individual detectors, with only a small amount of overlap at the edges.

In the embodiment shown in Figs. 7 and 8 the radiation responsive devices 119 are luminophors which generate light scintillations when irradiated. A single photographic film 123 on spools 125 and 127 within a light-proof box 129 is passed over a cylindrical surface 131 adjacent the upper ends of the detectors so that scintillations from all of the luminophors 119 are recorded on separate adjoining areas of the single film 123. Indexing of the film periodically is accomplished in the manner described previously.

It is evident that instead of this simple and direct photographic method, there also may be used an electrical system wherein the scintillations from each luminophor, or the pulses of an electrical pulse generating device, are converted to individual electrical impulses, and these electrical impulses are used to operate individual light sources of the type shown in Fig. 2. The lights are severally focused to record radiation intensity on separate adjoining areas of a single photographic film similarly to Fig. 10. Also, a plurality of records on tape may be made by punching, inking or the like, as described previously in connection with Fig. 2, and these records may be correlated with terrain photographs to locate deposits.

While a cluster of nine radiation detector units has been described above by way of example, it is evident that more or less detector units can be employed in accordance with the size of the area to be surveyed and the degree of discrimination desired.

It is desirable that the individual radiation shields have flat sides and have shapes such as slender truncated cones or prisms so that they may fit closely together and may detect areas with relatively short boundary lines for the greatest accuracy. Square, triangular, hexagonal and other cross sectional shapes are satisfactory. Cells of circular cross section can also be used, particularly where the possibility of dead spots is not too undesirable.

Figure 9:
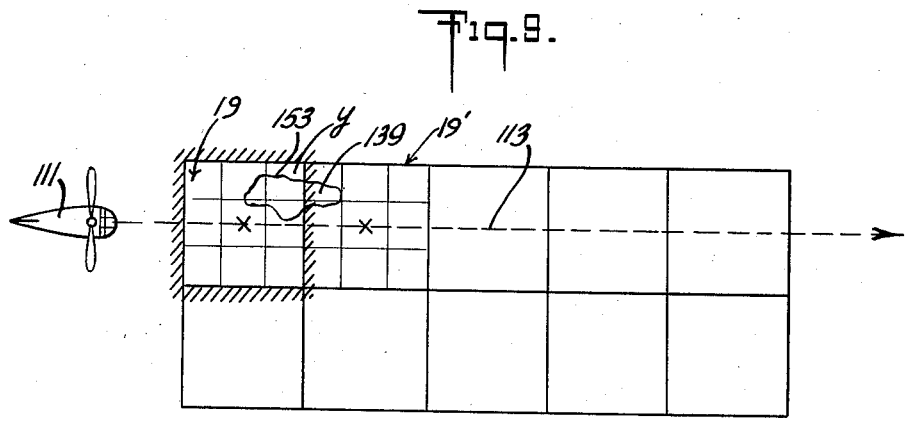
Fig. 9 is a diagram showing schematically a bird's eye view of a portion of the earth's surface showing schematically how a survey is conducted with a multiple unit radiation detector of the type shown in Fig. 7.

When using the radiation detector having such individual radiation units as shown in Figs. 7 and 8 to survey a large area of the terrain, as shown in Fig. 9, wherein there exists a deposit of radioactive ore, as shown at 139, an aircraft 111 carrying a camera 15 and radiation detector 17 flies continuously along the line 113. When it is centered over the large square area 19 the photographic camera 15 and the radiation detector 17 are actuated simultaneously. Camera 15 takes a picture of the large square area 19, which may be 150 feet square, and produces a photographic image on the film 141 as shown at 143 in Fig. 11. The radiation received from the same area by the nine radiation detector units is recorded on a second film 145 having a frame 146 which is intensely fogged on three adjoining squares 147, 148 and 149, as seen in Fig. 10, as a result of intense radiation coming from the deposit 139. On a fourth square 151 the film is fogged to a lesser extent because less radiation comes from the small part 153 of the deposit seen by the central detector unit 111b. The rest of the frame 146 is relatively clear because the individual detector units focused on this part of the film do not see any part of the radioactive deposit 139.

Upon indexing of the films 145 and 141 to the next adjoining square 19', followed by actuation of the camera and radiation detector, an additional intensely fogged area 155 and a lesser fogged area 157 appear on the frame 159, thus showing that the radioactive deposit 139 extends over into the next adjoining area 19' to some extent.

The location of the radioactive deposit 139 by a ground party is readily accomplished by positioning the films 141 and 145 in juxtaposition, either one on top of the other or alongside of one another, and correlating the position of the radioactive deposit with respect to land marks appearing on the photographic film 141 as shown schematically in Fig. 11.

When using a conventional continuous type of aerial camera, which operates with a continuously open aperture without a shutter mechanism, there is obtained a pictorial photograph like that of Fig. 11, but without the transverse lines of demarkation between frames. In conjunction with such a camera there is employed a radiation detector unit comprising two or more individual shutterless detectors arranged in a line transversely of the strip of terrain being photographed, for example three detectors arranged like 111-a, b and c of Fig. 8. Such a detector unit will provide a record somewhat similar to that of Fig. 10 but more continuous in nature. For example, the areas 147, 148, and 155 will appear as a long strip increasing in darkness as deposit 139 is approached, continuing at a maximum above the deposit, and then diminishing in darkness as the deposit is left behind; similarly for areas 149, 151, and 157, but with a shorter peak period.

Correlation of the photographic records when using separate films is obtained by positioning the two films in juxtaposition with initial and final ends respectively adjoining one another. Alternatively, both records may be made on a single film strip. For simplicity, portions of the films between their ends may be correlated by means of appropriate index marks such as punch marks, light records, or the like along their edges.

The principles of the invention have been described above as applied to the location of radioactive ores by detecting positive anomalies in radioactivity. It is apparent that they also apply to the location of non-radioactive ores by the detection of negative anomalies, for which reference is made to U.S. Patent 2,562,914.

Obviously, many modifications and variations of the invention, as hereinbefore set forth may be made without departing from the spirit and scope thereof and therefore only such limitations should be imposed as are indicated in the appended claims.

We claim:

1. In prospecting apparatus, a photographic camera adapted to be focused for photographing on film an area of selected extent on the terrain; a radiation detector so constructed and arranged as to detect radiation from about said same area simultaneously with the photographing thereof, said radiation detectors comprising a plurality of adjoining collimated individual detector units so constructed and arranged as severally to detect radiation from adjoining parts of said areas, said radiation detector including means for converting varying radiation responses to correspondingly varying visual records; a vehicle mounting said camera and said radiation detector and movable along a path spaced above said terrain; and means for simultaneously making visual records of successive adjoining areas of said terrain in response to said camera and radiation detector.

2. Prospecting apparatus in accordance with claim 1, wherein said radiation detector includes means for converting varying radiation responses to correspondingly varying light rays, and means for making a photographic record on film of said varying light rays.

3. Prospecting apparatus in accordance with claim 2, wherein said radiation detector comprises a luminophor adapted to generate scintillations in response to radiation, and said means for making a photographic record comprises means for positioning photographic film adjacent said luminophor for direct recording of light thereon.

4. Prospecting apparatus in accordance with claim 3, also comprising means for converting said scintillations to amplified electrical signals and means for converting said amplified signals to such light rays.

5. Prospecting apparatus in accordance with claim 1, wherein said radiation detector comprises electrical impulse generating means responsive to such radiation, and means for converting into such visual record the electrical impulses generated.

6. Prospecting apparatus in accordance with claim 1, wherein said means for making a photographic record is so constructed and arranged as to record on adjoining areas of a single film manifestions of the radiation detected by each of said individual detector units.

7. Prospecting apparatus in accordance with claim 6, wherein said individual detector units comprise tubular radiation shields having radiation receiving ends of relatively great area, and side walls tapering toward one another from said radiation receiving ends, and wherein radiation detecting elements are located within said shields at positions remote from said radiation receiving ends.

8. A radiation detector comprising a plurality of adjoining collimated individual detector units comprising tubular radiation shields having radiation receiving ends of relatively great area, and side walls tapering toward one another from said radiation receiving ends, said tubular radiation shields having longitudinal axes tapering together from said radiation receiving ends, and radiation detecting elements located within said shields at positions remote from said radiation receiving ends.

9. A radiation detector and recorder comprising a plurality of collimated detector units each having a tubular radiation shield with a radiation receiving end, a luminophor responsive to radiation located at a position remote from said radiation receiving end, means for positioning a photographic film adjacent said luminophor, and mechanism for moving said film to expose new areas thereof to light from said luminophor.

10. A radiation detector in accordance with claim 9, also comprising a movable shutter between said luminophor and said film, and a radiation-pervious light-impervious shield between said luminophor and said radiation receiving end.

11. A radiation detector and recorder in accordance with claim 9, comprising a plurality of said collimated detector units severally provided with luminophors, and wherein said means for positioning film is so constructed and arranged as to position a single film adjacent all of said luminophors to make individual adjoining records of radiation detected by all of said detector units.

12. In geological radioactivity surveying apparatus adapted to be transported in a vehicle over an area to be surveyed, the improvement which comprises means for photographing successive adjoining areas of terrain from a remote position to form a pictorial strip, and means for concurrently detecting at said position the radiation from said same areas as a plurality of separate responses from adjoining parts of said areas, said separate responses being convertible to corresponding visual records for correlation with said photographs.

13. Apparatus according to claim 12 wherein said radiation detecting means comprises at least one luminophor for producing scintillations in response to gamma radiation.

14. In geological radioactivity surveying apparatus adapted to be transported in a vehicle over an area to be surveyed, the improvement which comprises means for photographing successive adjoining areas of terrain from a remote position to form a pictorial strip, means for concurrently detecting at said position the radiation from said same areas as a plurality of separate responses from adjoining parts of said areas, and means for converting said separate responses to visual records in the form of adjoining photographs on a single photographic film.

15. In geological radioactivity surveying apparatus adapted to be transported in a vehicle, such as an aircraft, for conducting a radioactivity survey of selected terrain, the improvement which comprises a photographic camera having a predetermined angle of view for photographing a selected portion of the terrain, means for concurrently detecting and recording radiation from said portion of the terrain including a radiation detector having substantially the same overall angle of view as said camera and comprising a plurality of distinct radiation detecting elements whose respective angles of view are substantially limited to different adjoining areas within the area subtended by the overall angle of view of said camera in order to form a mosaic radiation record corresponding to each photographed portion of the terrain.

16. In geological radioactivity surveying apparatus adapted to be transported in an aircraft over an area to be surveyed the improvement comprising means for making an aerial pictorial photograph of a relatively large area of the terrain and means for simultaneously detecting and recording radiation emanating from a plurality of individual finite relatively small adjoining areas within said relatively large area, thereby to provide a radiological mosaic map for correlation with the pictorial photographs of said terrain.

References Cited in the file of this patent

UNITED STATES PATENTS

| | | |
|---|---|---|
| 2,499,489 | Goldstein et al. | Nov. 7, 1950 |
| 2,557,158 | Teichmann | June 19, 1951 |
| 2,562,969 | Teichmann | Aug. 7, 1951 |
| 2,617,945 | Lord et al. | Nov. 11, 1952 |
| 2,678,398 | Herzog | May 11, 1954 |
| 2,688,095 | Andrews | Aug. 31, 1954 |
| 2,705,757 | Shurcliff | Apr. 5, 1955 |